United States Patent [19]

Chadwick

[11] Patent Number: 4,774,841
[45] Date of Patent: Oct. 4, 1988

[54] MONITORING THE LEVEL OF A STACK OF COINS

[75] Inventor: Neville D. Chadwick, Hucknall, England

[73] Assignee: Bell-Fruit Manufacturing Company Limited, Lenton, England

[21] Appl. No.: 51,750

[22] Filed: May 20, 1987

[30] Foreign Application Priority Data

May 22, 1986 [GB] United Kingdom ............... 8612479

[51] Int. Cl.$^4$ ...................... G01S 15/08; G07D 9/00; G07F 9/00
[52] U.S. Cl. ...................................... 73/597; 73/163; 367/908; 453/17
[58] Field of Search .................. 73/597, 627, 628, 629, 73/163; 453/17; 367/99, 908; 342/124; 356/4.5, 5

[56] References Cited

U.S. PATENT DOCUMENTS

| 4,092,990 | 6/1978 | Bayne ................................... 453/55 |
| 4,555,942 | 12/1985 | Ludvigsson .......................... 73/433 |
| 4,576,286 | 3/1986 | Buckley et al. .................... 209/590 |

Primary Examiner—John Chapman
Attorney, Agent, or Firm—Scrivener and Clarke

[57] ABSTRACT

The level of a stack of coins in a stack tube is monitored by an ultrasonic transducer disposed above the stack tube. The transducer directs a train of ultrasonic pulses down towards the top of the stack and measures the transit time between the emitted and reflected pulses. The monitoring apparatus is particularly suitable for use in a gaming, amusement, vending or change machine which has a number of stack tubes from which coins are payed out by a payout device under the control of a control unit.

7 Claims, 1 Drawing Sheet

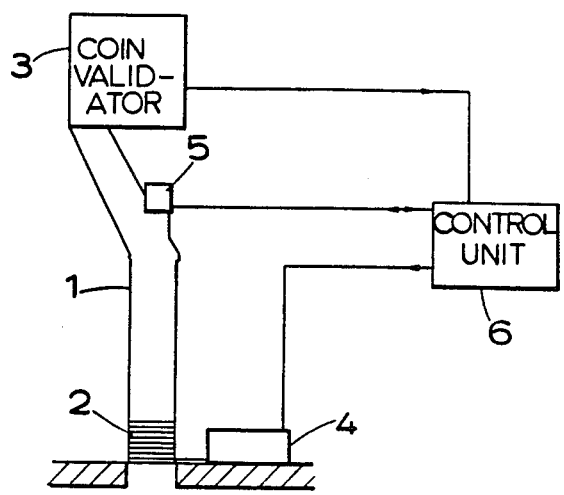

MONITORING THE LEVEL OF A STACK OF COINS

This invention relates to a method of and apparatus for monitoring the levels of a stack or heap of coins (and by this phrase we include also equivalents such as tokens). It is particularly applicable to machines which include equipment for storing coins and paying them out from stack tubes or payout hoppers.

In gaming and amusement machines, vending machines, ticket machines, change-givers and the like it is usual to store the incoming coins in so-called stack tubes and pay them out from the bottoms of the tubes by means of a solenoid. It is important that the stack tubes should not become empty, at least not without warning, and there are various arrangements for ensuring that they are topped up, or at least for ensuring that action is taken if they are running low, e.g. diversion of the payout to coins of a different denomination. Also, when the machines are opened up to collect the money in them, the collector has to see that there is an adequate 'float' left in each stack tube.

There is therefore a need for means to detect automatically when the level of coins in the tube is above or below a certain point and various proposals have been made to meet this need. For example a micro-switch may be placed alongside the tube with its actuating arm protruding into the tube so that the presence of a coin at the given height closes the switch. However this only tells one whether the top of the stack of coins is above or below that level, and if a more accurate indication is required several such switch, vertically spaced apart, are required. The same is true of another possibility, in which a lamp directs a beam of light across the stack tube to fall on a photo-cell (see GB Patent Specification No. 2 106 640 A). It has also been proposed to use the Hall effect (with a non-metallic stack tube), or simply to count the coins in and count the coins out and keep a running total. This last-mentioned proposal, however, suffers from the drawback of cumulative error building up, for example if two coins drop into the tube together and are counted as one. It is also upset if any coins are manually added or extracted, as will happen if the collectors are instructed to leave the stack tubes with a predetermined float in them.

The aim of the invention is to provide a much better monitoring of the level of coins in a stack tube but without the complication and bulk that would be involved in multiple switches or photo-cells.

According to one aspect of the invention we propose a method of monitoring the level of a stack or heap of coins comprising the steps of transmitting and directing a signal towards the top of the stack or heap and measuring the time taken by the signal to be reflected back to a receiver. Put shortly, we use a form of radar or sonar. The signal is preferably directed downwards, substantially parallel to the axis of a stack of coins (which is not necessarily vertical) although it would be inclined to some degree. In a preferred arrangement, an ultrasonic train of pulses is used, generated by a suitable transmitting transducer and the reflected pulses are picked up by a receiving transducer alongside (or it could be the same one). The system gives a continuous indication of the exact height of the stack within any range determined by the designer of the equipment.

Although ultrasonic signals are preferred, other forms could be used, e.g. electromagnetic radiation (radar) or optical interferometry. The essential thing is that a signal is obtained giving the position of the surface of the uppermost coin in the stack or heap without any mechanical feelers or other direct contact.

The output, basically in the form of a transit time between the emitted and reflected pulses, may be translated into a number representing the actual number of coins in the stack, this number being used for whatever further purpose it is required, e.g. for warning of a low stack, or for directing coins to alternative stacks when the one in question is becoming full. Where coins are being paid out as change in a number of different denominations from different stacks, as in a change-giver, the signals from the different stacks may be used to modify continuously the composition of the payout to suit the relative availability of the various denominations.

According to another aspect of the invention there is provided apparatus for monitoring the level of a stack or heap of coins according to the method described above and comprising a transmitting transducer which transmits the signal or train of pulses towards the top of the stack or heap, a receiving transducer which receives the signal or train of pulses reflected back from the top of the stack or heap, and time-measuring means for measuring the transit time between the emitted and reflected signals or pulses.

Conveniently, a single ultrasonic transducer may serve both as the transmitter and the receiver, and a typical frequency could be 40 KHz, although other frequencies might be used, depending on the maximum and minimum heights to be expected, which would determine the lower and upper limits on the pulse reaction time.

The method and apparatus in accordance with the present invention will now be described, by way of example only, with reference to the accompanying drawing. The drawing shows a machine, for instance a gaming, amusement, vending or change machine, having a stack tube 1 in which coins 2 are stored, a coin input device 3 which may include coin validation means and a payout device 4 for paying coins out from the bottom of the stack tube 1.

The machine also includes apparatus for monitoring the level of coins 2 in the stack tube 1. This apparatus comprises an ultrasonic transducer 5 disposed above the stack tube and which serves both as a transmitter for transmitting and directing a train of ultrasonic pulses down the tube and as a receiver for receiving the train of pulses reflected back from the top coin of the stack in the tube 1. The transducer may also include a timer which measures the transit time between the emitted and reflected pulses, and the height of the coin stack can be calculated from this measured transit time by a control unit 6 connected to the transducer 5.

Preferably, the control unit 5 translates stack height signals from the transducer 5 into a number representing the actual number of coins in the stack and this number is continuously monitored. The control unit 6 may also receive 'coin-in' signals from the coin input device 3 and send or receive 'payout' signals to or from the payout device 4. In this manner the control unit may be used, for example, to detect unauthorised removal of coins from the stack tube, to give a warning of a low stack or, where there are a plurality of coin stacks, to control the payout in accordance with the number of coins in each stack tube.

It will be appreciated that the method described above with reference to the drawing could, in principle, be used to monitor the level of a number of coins stacked on edge, or even the level of a heap of coins in, say, a payout hopper or cash box. For instance, it might be appropriate to use more than one transmitting-/receiving transducer to monitor the level of a heap of coins.

I claim:

1. A method of monitoring the level of a stack of coins or tokens stored in a generally upright stack tube comprising the steps of transmitting and directing a signal downwards, substantially parallel to the axis of said stack tube towards the top of the stack and measuring the time taken for the signal to be reflected back to a receiver.

2. A method according to claim 1 in which a train of pulses is generated by a transmitting transducer and directed towards the top of the stack and the reflected train of pulses is picked up by a receiving transducer to give a continuous indication of the height of the stack.

3. A method according to claim 2 in which a train of ultrasonic pulses is used.

4. A method according to claim 1 in which the measured transit time between the emitted and reflected signal or pulses is translated into a number representing the number of coins or tokens in the stack.

5. Apparatus for monitoring the level of a stack of coins or token stored in a stack tube comprising a transmitting transducer disposed above the top of said stack tube and which transmits a train of signal pulses downwards, substantially parallel to the axis of said stack tube, a receiving transducer which receives the train of signal pulses reflected back from the top of the stack of coins or tokens, and a time-measuring means for measuring the transit time between the emitted and reflected pulses to give a continuous indication of the height of the stack of coins or tokens.

6. Apparatus according to claim 5 in which a single ultrasonic transducer serves both the transmitter and receiver.

7. A gaming, amusement, vending or change machine having a number of stack tubes in which coins or token are stored and which incorporates apparatus for monitoring the level of coins or tokens in each of said stack tubes in accordance with claim 5

* * * * *